United States Patent
Shim et al.

(10) Patent No.: US 6,646,705 B1
(45) Date of Patent: *Nov. 11, 2003

(54) IN-PLANE SWITCHING TYPE LIQUID CRYSTAL DISPLAY DEVICES WITH INCREASED CELL GAP AND METHODS OF FABRICATION THEREFOR

(75) Inventors: Jung-Uk Shim, Seoul (KR); Sung-Tae Shin, Kyungki-do (KR); Kyeong-Hyeon Kim, Kyungki-do (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,357

(22) Filed: Sep. 30, 1997

(30) Foreign Application Priority Data

Oct. 22, 1996 (KR) .............................. 96-47511

(51) Int. Cl.[7] ........................ G02F 1/1343; C09K 19/02
(52) U.S. Cl. ........................................ 349/141; 349/177
(58) Field of Search ............................ 349/99, 42, 44, 349/141, 143, 177

(56) References Cited

U.S. PATENT DOCUMENTS

| | | | | |
|---|---|---|---|---|
| 5,150,241 A | * | 9/1992 | Joffre et al. | 349/141 |
| 5,598,285 A | * | 1/1997 | Kondo et al. | 349/141 |
| 5,600,464 A | * | 2/1997 | Ohe et al. | 349/123 |
| 5,680,187 A | * | 10/1997 | Nagayama et al. | 349/110 |
| 5,786,876 A | * | 7/1998 | Ota et al. | 349/143 |
| 5,910,271 A | * | 6/1999 | Ohe et al. | 349/19 |
| 5,995,186 A | * | 11/1999 | Hiroshi | 349/141 |

FOREIGN PATENT DOCUMENTS

| | | |
|---|---|---|
| JP | 7-225388 | 8/1995 |
| WO | WO91/10936 | 7/1991 |

OTHER PUBLICATIONS

Translation of Japanese Laid-Open Patent Application 7-225388.

* cited by examiner

Primary Examiner—Toan Ton
Assistant Examiner—Dung Nguyen
(74) Attorney, Agent, or Firm—Myers Bigel Sibley & Sajovec

(57) ABSTRACT

An in-plane switching type liquid crystal display device includes opposed first and second panels, defining a gap therebetween, the first and second panels including first and second electrodes, spaced laterally apart in the gap. A quantity of a liquid crystal material is disposed in the gap between the first and second panels, wherein a product of a refractive anisotropy of the liquid crystal material and the gap between the first and second panels is in a range between 0.36 $\mu$m and 0.45 $\mu$m. Preferably, the gap between the first and second panels is in a range between 4 $\mu$m and 5 $\mu$m, and the refractive anisotropy is in a range between 0.067 and 1.1016. Each of panels preferably has an alignment surface which is operative to align molecules of the liquid crystal material along an alignment direction, and a polarizer, attached to one of the first and second panels, selectively permits light having a polarization of 45° with respect to the alignment direction to pass through the quantity of liquid crystal material. Related fabrication methods are also described.

14 Claims, 4 Drawing Sheets

IN-PLANE SWITCHING TYPE LIQUID CRYSTAL DISPLAY DEVICES WITH INCREASED CELL GAP AND METHODS OF FABRICATION THEREFOR

FIELD OF THE INVENTION

The present invention relates to a liquid crystal display (LCD) devices and methods of fabrication therefor, more particularly, to in-plane switching (IPS) LCD devices and methods of fabrication therefor.

BACKGROUND OF THE INVENTION

In general, in-plane switching (IPS) mode LCDs have pixel electrodes and common electrodes which apply electric fields to a liquid crystal layer parallel to the substrate on which the electrodes are formed, as described, for example, in European Patent Application No. 93307154.0 (Publication No. 0 588 568 A2). As shown in FIG. 1, a gate line 1 is formed in a transverse direction and a data line 11 is formed in a longitudinal direction. A common electrode line 2 having a T-shaped extension with sections 3, 4 is formed parallel to the gate line 1, and may be formed from the same material as the gate line 1. A longitudinal section 3 extends to the gate line 1 and a transverse section 4 connected to one end of the longitudinal section 3 extends parallel to the adjacent gate line 1. A thin film transistor TFT is formed near the intersection of the gate line 1 and the data line 11, and has a gate electrode which is a portion of the gate line 1, a source electrode which is a portion of the data line 11, and a drain electrode 12 which may be made of the same material as the data line 11 and extends from a pixel electrode 16. The pixel electrode 16 is rectangular in shape, and includes two sides parallel to the data line 11 and two sides perpendicular to the data line 11 which overlap the common electrode line 2 and its transverse section 4. The longitudinal section 3 of the common electrode line 2 passes over the center of the rectangle defined by the pixel electrode 16. In an alternative arrangement illustrated in FIG. 2, a drain electrode 12 of a thin-film transistor TFI is connected to an H-shaped pixel electrode 16 having a longitudinal section 13 parallel to the data line 11 and two transverse sections 14 extending perpendicular to the data line 11, while the common electrode line 2 has a looplike portion extending therefrom.

In each of these electrode arrangements, electric fields may be generated between the extensions of the common electrode line 2 and the pixel electrode 16, causing rotation of the optical axes of liquid crystal molecules between the electrodes 2, 16 toward the direction of electric fields. Light passes through the liquid crystal layer with a transmittance T which may be determined by a conventionally-used formula:

$$T = \sin^2 2\theta \cdot \sin^2 \pi \cdot (\Delta n \cdot d)/\lambda$$

where θ is the angle between the long axes of the liquid crystal molecules and the direction of polarization, Δn is refractive anisotropy of the liquid crystal material, λ is wavelength of the light, and d is the gap, also known as "cell gap", between the two substrates of the device. Based on this formula, Japanese Patent Application No. 7-225388 has stated that it is preferable for Δn×d to be set between 0.21–0.36 μm in cases where θ=45° in order to achieve optimal transmittance. Unfortunately, however, the gap between substrates for this range of the product of refractive anisotropy and cell gap typically is small for conventionally-used liquid crystal materials. Consequently, a display device fabricated to achieve this product of refractive anisotropy and cell gap may be difficult and expensive to produce.

SUMMARY OF THE INVENTION

In light of the foregoing, it is an object of the present invention to provide in-plane switching type liquid crystal displays which may be efficiently produced.

It is another object of the present invention to provide in-plane switching type liquid crystal display devices which have optimal transmittance with increased cell gap in comparison to conventional devices.

This and other objects, features and advantages are provided according to the present invention by liquid crystal display devices for which the product (Δn×d) of the refractive anisotropy (Δn) of the liquid crystal material in the display and the cell gap (d) between the panels confining the liquid crystal material is between 0.36 μm and 0.45 μm, preferably when the angle (θ) between the alignment direction of alignment surfaces of the panels and the polarization direction of light passing through the liquid crystal material contained by the alignment surfaces is around 45°. The present invention arises from the experimental discovery that desirable transmission characteristics may be achieved at higher values of the product of refractive anisotropy and cell gap than conventionally predicted. Accordingly, devices may be fabricated with a larger cell gap, allowing the use of less expensive fabrication techniques.

In particular, according to the present invention, an in-plane switching type liquid crystal display device includes opposed first and second panels, defining a gap therebetween, the first and second panels including first and second electrodes, spaced laterally apart in the gap. A quantity of a liquid crystal material is disposed in the gap between the first and second panels, wherein a product of a refractive anisotropy of the liquid crystal material and the gap between the first and second panels is in a range between 0.36 μm and 0.45 μm. Preferably, the gap between the first and second panels is in a range between 4 μm and 5 μm, and the refractive anisotropy is in a range between 0.067 and 1.1016. Each of panels preferably has an alignment surface which is operative to align molecules of the liquid crystal material along an alignment direction, and a polarizer, attached to one of the first and second panels, selectively permits light having a polarization of 45° with respect to the alignment direction to pass through the quantity of liquid crystal material.

According to method aspects, an in-plane switching type liquid crystal display device is fabricated by forming opposed first and second panels, defining a gap therebetween, the first and second panels including first and second electrodes, spaced laterally apart in the gap. A quantity of a liquid crystal material is then placed in the gap between the first and second panels, wherein a product of a refractive anisotropy of the liquid crystal material and the gap between the first and second panels is in a range between 0.36 μm and 0.45 μm. Improved liquid crystal display devices are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
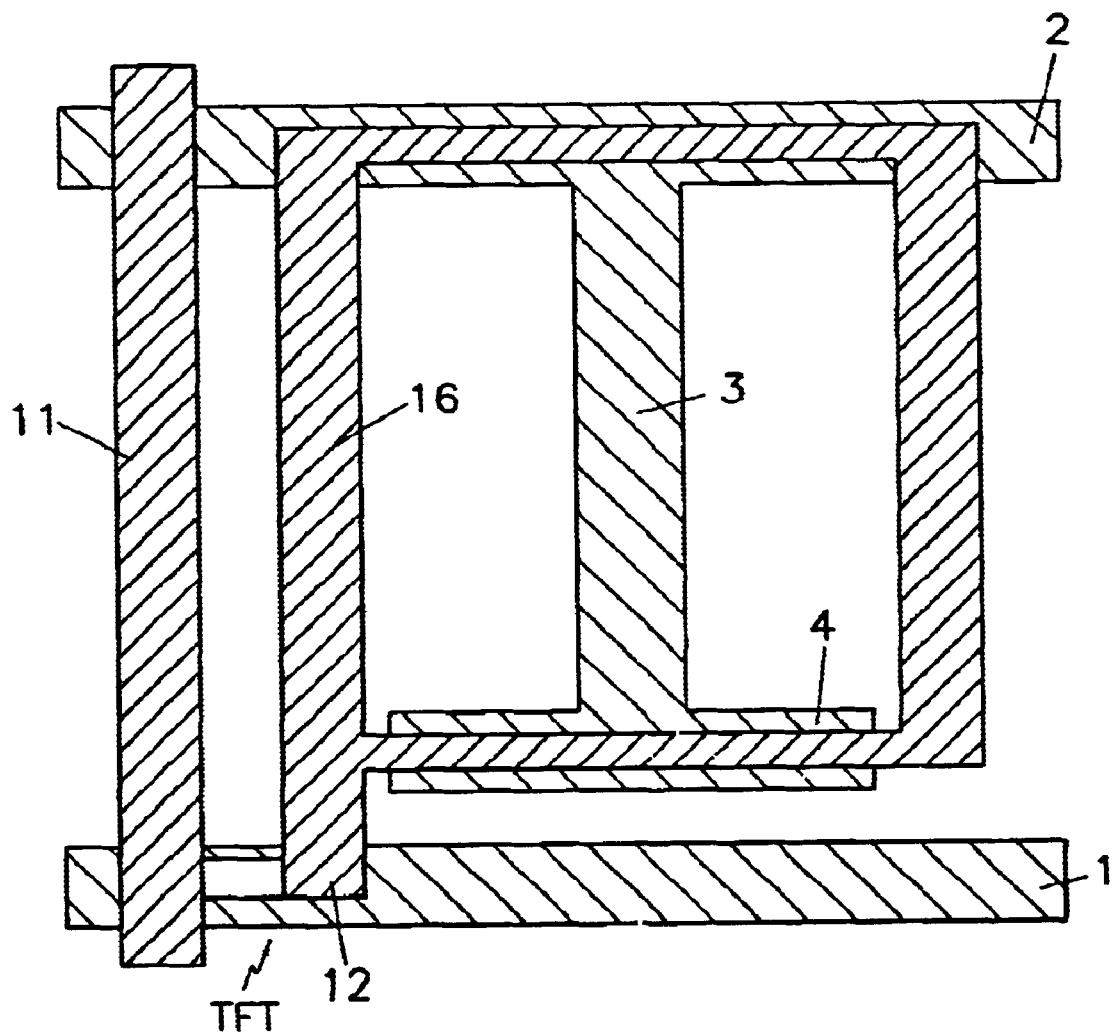
FIGS. 1 and 2 are plan views illustrating conventional in-plane switching (IPS) type liquid crystal display (LCD) devices.
Figure 2:
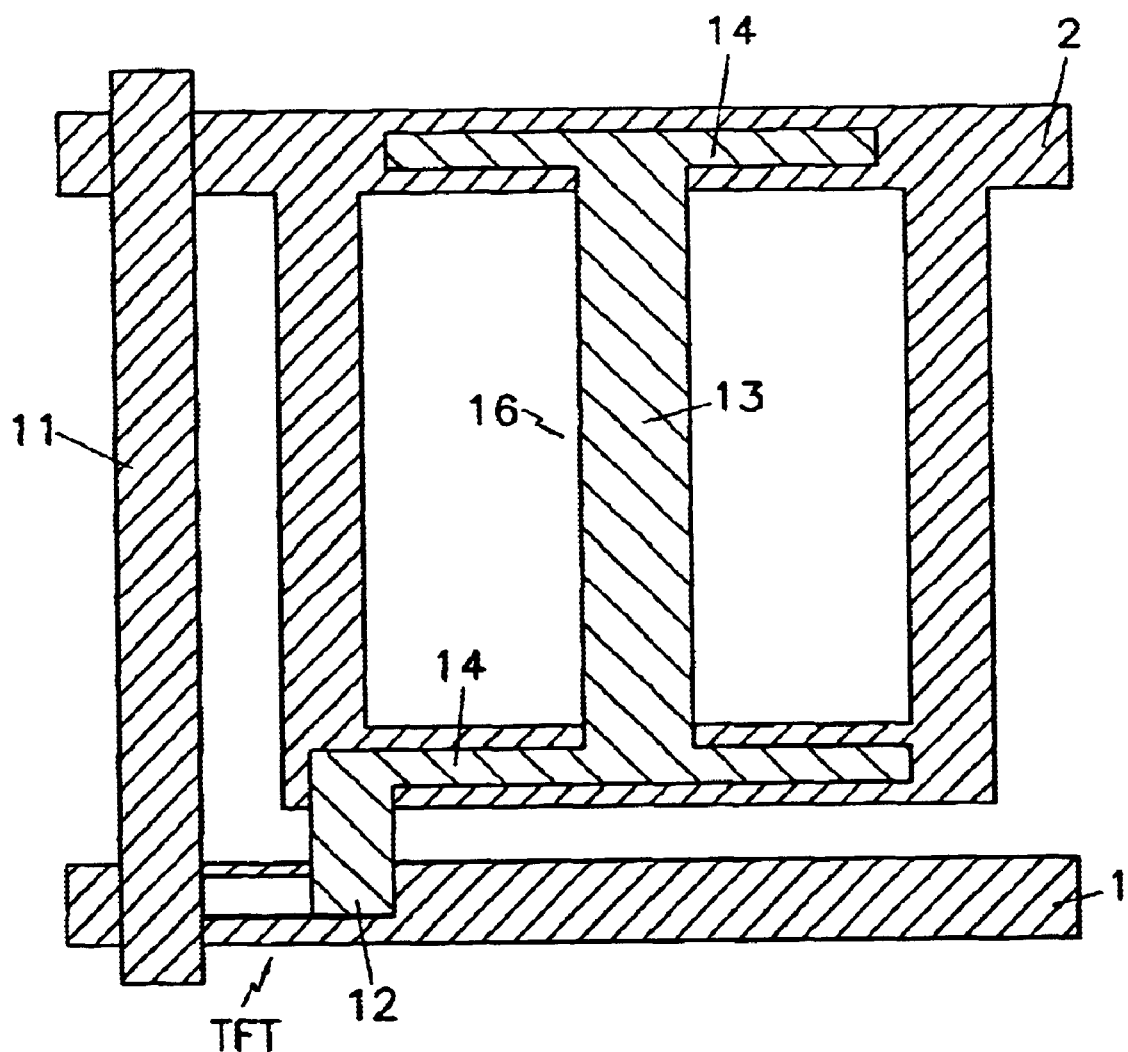

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, sizes and thicknesses of regions may be exaggerated for purposes of clarity, and like numbers refer to like elements throughout.

Figure 3A:
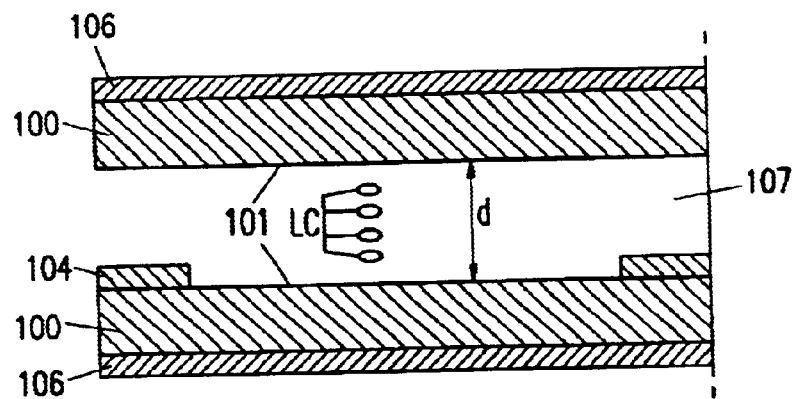
FIGS. 3A and 3B are cross-sectional views illustrating an IPS type LCD and operations for fabrication thereof according to the present invention.
Figure 3B:
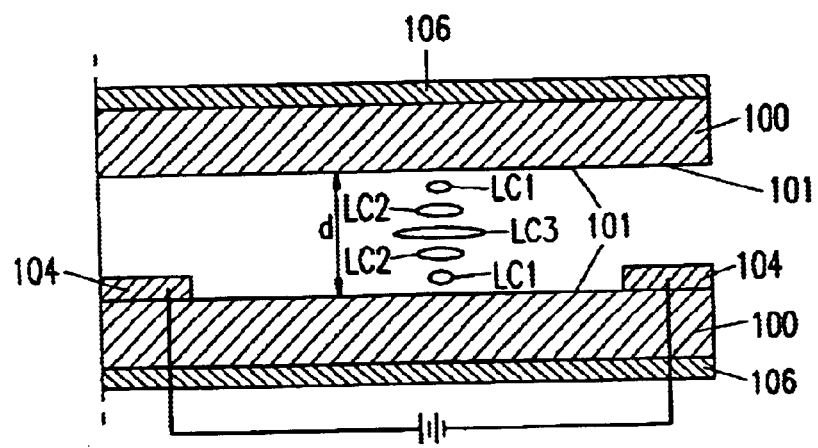

FIGS. 3A and 3B show cross-sectional views of an IPS type LCD device according to the present invention, including two transparent panels 100 and a quantity of liquid crystal material 107 disposed between the two transparent panels 100. The panels 100 have electrodes 104 are formed thereon, laterally spaced apart in a gap d between the panels 100. The gap d between the two panels between the electrodes 104 preferably is in a range of 4 $\mu$m to 5 $\mu$m, more preferably 4.5 $\mu$m. Alignment surfaces 101 are formed on the panels 100, and a quantity of the liquid crystal material 107 is placed between the panels 100, contacting the alignment surfaces 101. The alignment surfaces 101 are operative to align molecules LC of the liquid crystal material 107 along an alignment direction, e.g., a direction oriented at an angle of 45° with respect to an axis running between the electrodes 104. Polarizers 106 are attached to outer surfaces of the panels 100 and selectively allow light having a selected polarization, for example, light having a polarization of 45° with respect to the alignment direction, to pass through the quantity of liquid crystal material. Those skilled in the art will appreciate that although the electrodes 104 are shown as being formed on one of the panels, the electrodes 104 may also be formed such that a respective one of the electrodes 104 is disposed on a respective one of the panels 100.

FIG. 3A illustrates orientation of the liquid crystal molecules LC when no voltage is applied across the electrodes 104, i.e., the liquid crystal molecules LC of the liquid crystal material 107 are oriented such that the long axes of the liquid crystal molecules LC are aligned with the alignment surfaces 101, e.g., such that the long axes of the liquid crystal molecules LC lie at an angle of 45° with respect to an axis running between the electrodes 104.

When a voltage is applied to the electrodes 104, the orientations of liquid crystal molecules LC change, as illustrated in FIG. 3B. The liquid crystal molecules L1 adjacent to the alignment surfaces 101 are more closely aligned with the alignment direction of the alignment surfaces 101, as these molecules are less influenced by the electric field associated with the voltage applied to the electrodes 104, the force of the alignment surfaces 101 being stronger than that of the electric field. In contrast, the liquid crystal molecules L3 further away from the alignment surfaces 101 are more closely aligned with the applied electric field, as the force of the electric field overcomes the force of the alignment surfaces 101 Molecules L2 in between may be oriented to a direction lying between the alignment direction and the electric field orientation.

Figure 4:
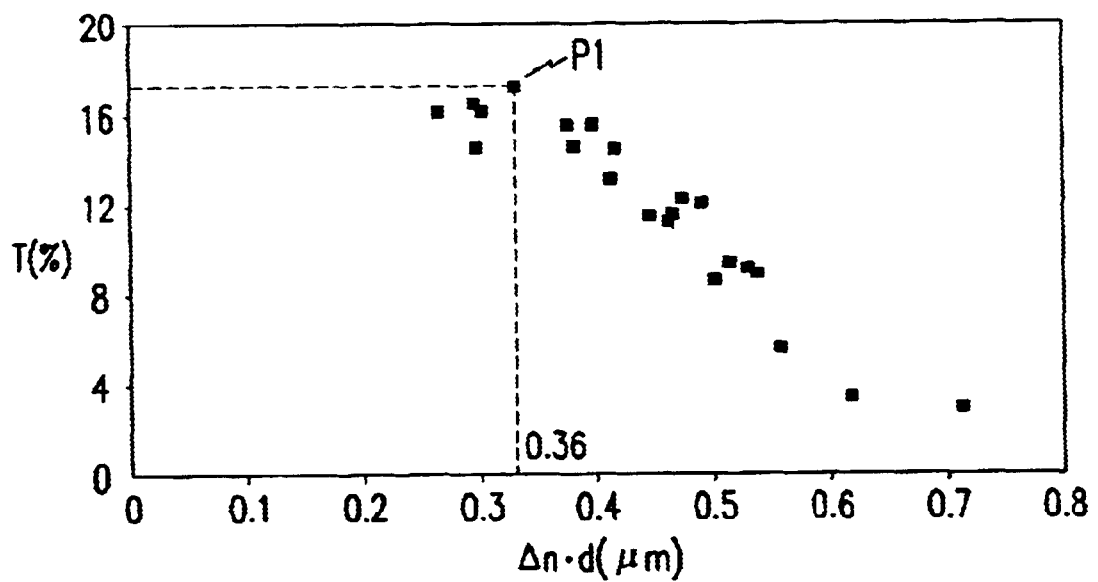
FIG. 4 is a graph illustrating a transmittance characteristic of an IPS type LCD device according to the present invention.

FIG. 4 is a graph illustrating a light transmittance characteristic T of an IPS type LCD device according to the present invention, with respect to the product ($\Delta n \times d$) of the refractive anisotropy ($\Delta n$) of the liquid crystal material and the gap (d) between the panels. The inventors have discovered that using a liquid crystal material having a refractive anisotropy ($\Delta n$) in the range between 0.067 and 1.106, a maximum value P1 of the light transmittance T occurs around where $\Delta n \times d = 0.36$ $\mu$m, an experimental result which is quite different from transmittance values conventionally predicted for IPS type LCD devices. Accordingly, a cell gap of around 4 $\mu$m to 5 $\mu$m may be used to achieve maximum transmission through the LCD device. Preferably, liquid crystal materials such as Merck Model MLC 6012 ($\Delta n$ of 1.1016), Chisso Model ZSM-5024 ($\Delta n$ of 0.077), and Chisso Model ZSM-5024 ($\Delta n$ of 0.067) are used with a cell gap of 4.5 $\mu$m to achieve maximum transmission. As the magnitude of the cell gap is significantly larger than that employed in conventional IPS type LCD devices, fabrication productivity may be improved and fabrication cost may be reduced.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An in-plane switching type liquid crystal display device, comprising:

opposed first and second panels, defining a gap therebetween;

first and second electrodes, spaced laterally apart in said gap; and a quantity of a liquid crystal material disposed in said gap between said first and second panels, wherein the liquid crystal material exhibits a maximum transmittance for a value of a product of cell gap and refractive anisotropy greater than 0.33 $\mu$m, and wherein the product of the refractive anisotropy of said quantity of liquid crystal material and said gap between said first and second panels is in a range between 0.36 $\mu$m and 0.45 $\mu$m.

2. A device according to claim 1, wherein said gap is in a range between 4 $\mu$m and 5 $\mu$m.

3. A device according to claim 2, wherein said gap is 4.5 $\mu$m.

4. A device according to claim 2, wherein each of said panels has an alignment surface which is operative to align molecules of said liquid crystal material along an alignment direction, and further comprising a polarizer, attached to said opposed first and second panels, which selectively permits light having a polarization of 45° with respect to said alignment direction to pass through said quantity of liquid crystal material.

5. A device according to claim 1, wherein said refractive anisotropy is in a range between 0.067 and 1.016.

6. A device according to claim 5, wherein said refractive anisotropy is one of 1.1016, 0.077 or 0.067.

7. A device according to claim 5, wherein each of said panels has an alignment surface which is operative to align molecules of said liquid crystal material along an alignment direction, and further comprising a polarizer, attached to said opposed first and second panels, which selectively permits light having a polarization of 45° with respect to said alignment direction to pass through said quantity of liquid crystal material.

8. A device according to claim 1, wherein each of panels has an alignment surface which is operative to align molecules of said liquid crystal material along an alignment direction, and further comprising a polarizer, attached to said opposed first and second panels, which selectively permits light having a polarization of 45° with respect to said alignment direction to pass through said quantity of liquid crystal material.

9. A method of forming an in-plane switching type liquid crystal display device, the method comprising the steps of:

forming opposed first and second panels, defining a gap therebetween;

forming first and second electrodes, spaced laterally apart in the gap; and placing a quantity of a liquid crystal material in the gap between the first and second panels, wherein the liquid crystal material exhibits a maximum transmittance for a value of a product of cell gap and refractive anisotropy greater than 0.33 $\mu$m, and wherein the product of the refractive anisotropy of the liquid crystal material and the gap between the first and second panels is in a range between 0.36 $\mu$m and 0.45 $\mu$m.

10. A method according to claim 9, wherein the gap between the first and second panels is in a range between 4 $\mu$m and 5 $\mu$m.

11. A method according to claim 10, wherein the gap is 4.5 $\mu$m.

12. A method according to claim 9, wherein the refractive anisotropy is in a range between 0.067 and 1.016.

13. A method according to claim 12, wherein the refractive anisotropy is one of 1.1016, 0.077 or 0.067.

14. A method according to claim 9, wherein said step of forming first and second panels comprises the step of forming first and second alignment surfaces on the first and second panels, respectively, each of the first and second alignment surfaces being operative to align molecules of the liquid crystal material along an alignment direction, and further comprising the step of forming a polarizer, attached to one of the first and second panels, which selectively permits light having a polarization of 45° with respect to the alignment direction to pass through the quantity of liquid crystal material.

* * * * *